Feb. 16, 1971     K. SCHWADERLAPP     3,562,951
CHRISTMAS TREE STAND WITH WATER CONTAINER
Filed March 14, 1969
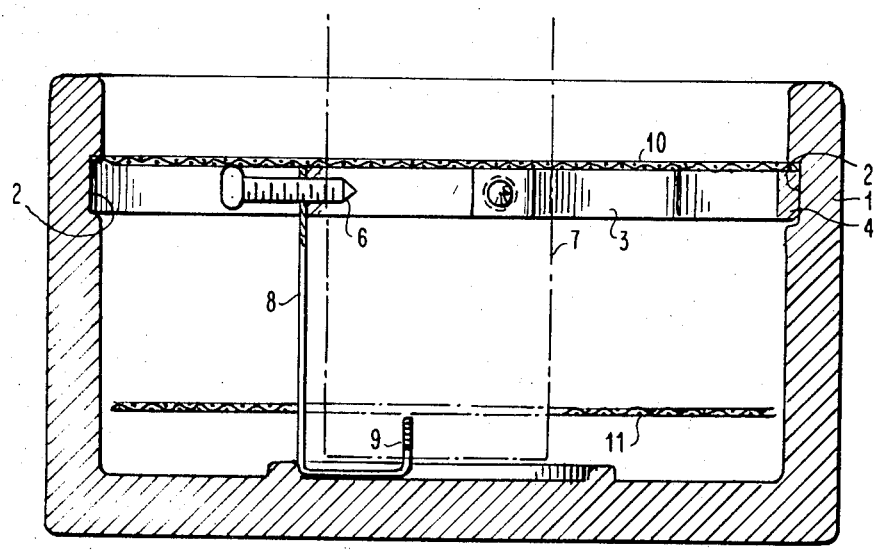
FIG.1
FIG.2
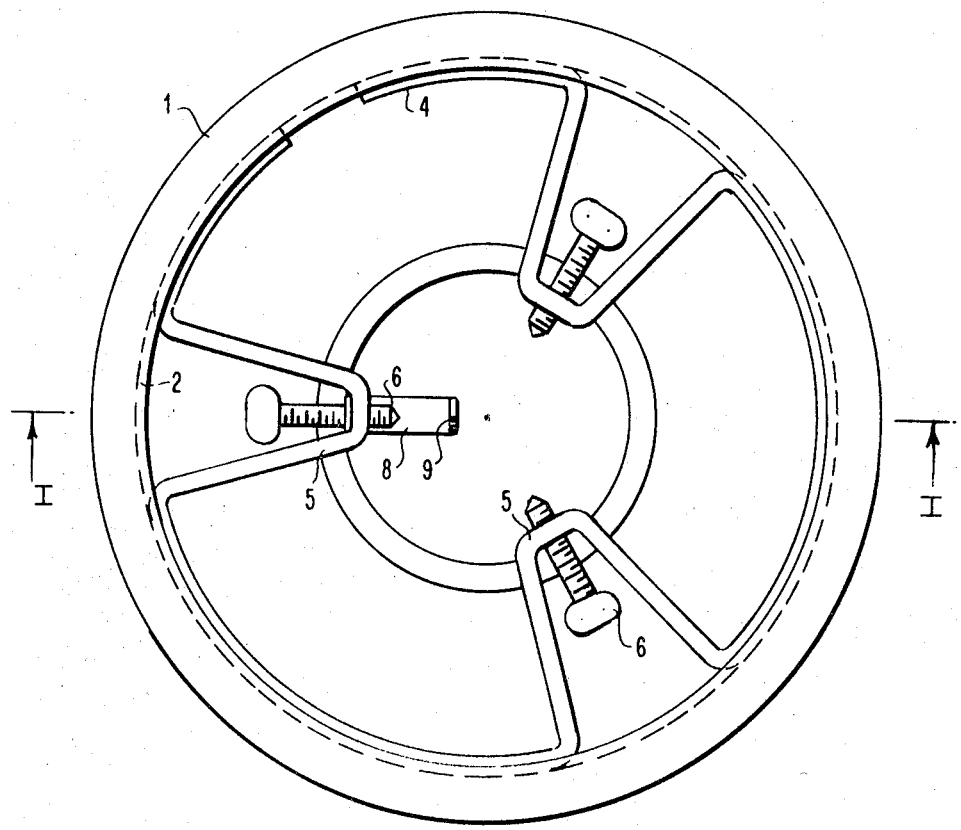

3,562,951
CHRISTMAS TREE STAND WITH
WATER CONTAINER
Kurt Schwaderlapp, Baumbach, Westerwald, and Anton Schoplocher, Ransbach-Baumbach, Germany, assignors to Jasba-Keramikfabriken, Jakob Schwaderlapp K.G., Baumbach, Germany, a corporation of Germany
Filed Mar. 14, 1969, Ser. No. 807,182
Claims priority, application Germany, Mar. 15, 1968,
P 17 53 127.0
Int. Cl. A47g *33/12, 7/07*
U.S. Cl. 47—41.11
9 Claims

ABSTRACT OF THE DISCLOSURE

Christmas tree stand and water container includes upper insert means for holding a tree, the upper insert means being disposed in the water container and including locking means at the wall of the container, a springy wave-shaped band disposed about the inner periphery of the container wall and formed with radially inwardly directed bows having threaded openings substantially at the apices thereof, and holding screws threaded in the openings and tightenable against a tree inserted therebetween, the band being formed with radially outwardly directed bows cooperably engaging the locking means for locking the band in the container when the holding screws are tightened against a tree.

---

My invention relates to Christmas tree stands with water containers and inserts for holding and centering the tree.

Many forms and constructions of Christmas tree stands with water containers and special inserts for holding the tree are known. Generally, the Christmas tree stands and the respective water container must be adjusted to or coordinated with one another and the shape and structural material thereof must be taken into consideration.

The insert, as a rule, should grip the end of the tree trunk by means of a holder with set screws, somewhat above the plane along which the trunk is severed and should simultaneously permit centering of the severing plane by relatively simple means in case the water container proper is not already equipped therefor, for example with circular grooves formed in the base thereof. Because of the aforementioned specific adjustment or conformation of the particular shape of the conventional water containers for Christmas tree stands produced heretofore to the specific insert for holding or supporting the tree, those water containers were able to be used only for that single purpose.

This one-sided use is considered to be disadvantageous and proposals have already been made to install conventional insert devices in the Christmas tree stands for holding cut flowers therein.

However, this is neither esthetically satisfying nor is there usually available for insertion in the Christmas tree stand a large enough number of cut flowers which will fit the generally great diameter of the water container for the Christmas tree stand.

The water container for Christmas tree stands that have been employed heretofore were also made as low as possible in consideration of the large supporting surface required for the base of the tree trunk, and are therefore not suitable for use as outer receptacles for flower pots, because a flower pot having a diameter corresponding to that of the known water container would extend too far above the edge of the water container and would be visible.

It is accordingly an object of my invention to provide Christmas tree stand with water container wherein the insert for holding the tree is largely independent of the shape of the water container, the bottom surface thereof and the material of which it is made so that cylindrical or multicornered posts as well as those that taper conically upwardly or downwardly may be supported therein.

In accordance with further objects of my invention, the insert in the water container is relatively inexpensive to produce and can be shipped or transported relatively simply, easily and in a space-saving manner.

In accordance with another object of my invention, I provide Christmas tree holder with water container which is suitable for holding screens or frames in which flowers can be inserted.

It is thus a general object of my invention to provide Christmas tree stand with water container which is suitable for mass production manufacture and consequently economically priced and attractive to the consumer and has multifaceted uses all year round as a Christmas tree stand at Christmas time as well as a flower vase for cut flowers or as an outer container for potted plants in the summer.

With the foregoing and other objects in view, I provide in accordance with my invention in combination, Christmas tree stand and water container comprising upper insert means for holding a tree, the upper insert means being disposed in the water container and comprising locking means at the wall of the water container, a springy wave-shaped band disposed about the inner periphery of the water container wall and formed with radially inwardly directed bows having threaded openings substantially at the apices thereof, and holding screws threaded in the openings and tightenable against a tree inserted therebetween, the wave-shaped band being formed with radially outwardly directed bows cooperably engaging the locking means for locking the band in the water container when the holding screws are tightened against a tree.

In accordance with a further feature of my invention, the locking means is in the form of a groove provided in the inner surface of the water container wall and extends either partially or entirely about the periphery thereof.

In accordance with another feature of my invention, particularly if the bottom of the water container is not formed with a recess for centering the Christmas tree therein, I provide additional means for holding and centering the tree comprising spearing means for penetrating from below into the severed end of the trunk of the tree.

In accordance with an additional feature of the invention, the radially outwardly directed bows of the wave-shaped band are received in the groove provided in the inner surface of the water container, the band having ends that are spaced from one another in the groove so as to permit the insert means to be installed in the water container by slightly pressing the resilient band together within the water container and releasing the same so that the radially outwardly directed portions of the band are received and locked in the peripheral groove formed in the water container wall.

In contrast to the heretofore known Christmas tree inserts wherein the adjusting screws pass through a special holder ring which surrounds the end of the tree trunk, such a holder ring is unnecessary in the Christmas tree stand and water container of my invention. On the contrary, in accordance with other features of my invention, adjusting screws are inserted, preferably by using rivet nuts, in the portions of the band bent radially inwardly toward the tree. After the end of the tree trunk has been inserted between these radially inwardly directed portions of the band, the adjusting screws are tightened and the tree trunk is straightened and held rigid. With the aid of this screw-tightening operation, the radially outwardly directed portions of the band are capable of being pressed so firmly into the groove formed in the peripheral inner surface of the water container that it cannot loosen itself therefrom.

The thicker the tree trunk is, the wider apart the arms of the radially inwardly directed bows spread. The radially outwardly directed bows can follow this movement because the free ends of the resilient bands are spaced from one another.

The part of my invention which is provided with radially inwardly and outwardly directed bows and adjusting screws is comprised of only the upper insert means which holds the tree. In accordance with an additional feature of my invention, centering of the tree is effected by spear means penetrating the severed end surface of the tree trunk so as to hold the tree in centered position relative to the wall of the water container.

Furthermore, in accordance with a feature of my invention, the spear means are formed of sheet metal strips having an end sharpened to a point so that it can penetrate the severed end of the tree trunk. The other end of the sheet metal strip is formed with a hole therein through which it is possible to firmly connect the sheet metal strip with the upper insert means by means of the force exerted by the adjusting screw. This connection is loosened for packaging the Christmas tree stand and water container. All parts of the insert are thus disassembled for shipping and reassembled by the consumer.

In accordance with yet another feature of the invention, the centering insert is also formed of upwardly directed pointed members, secured to the bottom of the water container by adhesive, which penetrate the severed end of the tree trunk. If the water container for potted plants is provided on the inner wall surface thereof with locking members or grooves, the pot is then inserted in the locking member or groove instead of in an upper insert means. If flowers are to be inserted in the water container, a grating or the like can be locked in the locking means or groove formed at the wall of the water container.

Other features which are considered as characteristic for the invention are set forth in the appended claims.

Although the invention is illustrated and described as embodied in Christmas tree stand with water container, it is nevertheless not intended to be limited to the details shown, since various modifications and structural changes may be made therein without departing from the spirit of the invention and within the scope and range of equivalents of the claims.

The construction of the invention, however, together with additional objects and advantages thereof may be best understood from the following description of specific embodiments when read in connection with the accompanying drawings, in which:

FIG. 1 is a cross-sectional view of a Christmas tree stand and water container constructed in accordance with my invention taken along the line I—I of FIG. 2; and FIG. 2 is a top plan view of FIG. 1.

Referring now to the drawing, there is shown in the figures a cylindrically shaped water container 1 formed with an annular groove 2 provided peripherally in the inner wall surface thereof. An upper insert member 3 includes a band of metal bent so that the outer portions thereof forming bows 4 face the wall of the water container 1 in which the peripheral groove is formed and are locked therein as shown in FIG. 2, while the radially inwardly directed bows 5, by using rivet nuts, are furnished with adjusting screws 6. The Christmas tree whose trunk end is represented by the broken lines 7 is firmly held by the tightening and penetration therein of the adjusting screws 6, while the upwardly bent sharpened points 9 of a holder arm 8 penetrate into the severed end surface of the tree trunk 7. These holder arms 8 are formed with a hole at the upper end thereof and preferably provided with a thread in the hole so that the holder arms 8 can be held firmly by the adjusting screws 6 at this location.

In the view of FIG. 2 it is clearly seen that the tensioning ring 4 is bent out of a single band of metal and the radially outwardly directed bows are reset in the annular groove 2 formed in the wall of the water container and firmly held therein under the pressure of the adjusting screws 6 which are tightened against the trunk of the tree.

As shown in FIG. 1, wire screens 10 and 11 are disposed on the upper insert 3 and on the lower centering insert 8 so that the stems of flowers can be inserted into the mesh thereof. As can be seen from the figures, a special holder ring in the upper part of the insert is no longer necessary so that expenses incident thereto are dispensed with. To make the upper insert 3 it is necessary only to employ a simple bending device in which the nuts for the adjusting screws 6 need only be applied by means of rivets or by simply being inserted therein.

For packaging purposes, particularly for shipping, it is of special significance that both the lower and upper insert means consist of bent metal bands which when assembled do not reach to a greater height within the water container than that at which the upper insert is located. A great advantage for shipping of the Christmas tree stand and water container of the invention is thereby achieved because all parts thereof are light in weight and flat for convenient stacking.

I claim:

1. In combination, Christmas tree stand and water container comprising upper insert means for holding a tree, said upper insert means being disposed in the water container and comprising locking means at the wall of the water container, a springy wave-shaped band disposed about the inner periphery of the water-container wall and formed with radially inwardly directed bows having threaded openings substantially at the apices thereof, and holding screws threaded in said openings and tightenable against a tree trunk insertable therebetween, said wave-shaped band being formed with radially outwardly directed bows cooperably engaging said locking means for locking said band in the water container when said holding screws are tightened against the tree trunk.

2. The combination of claim 1 wherein said locking means is a groove formed in the inner surface of the water container wall.

3. The combination according to claim 2 wherein said radially inwardly directed bows have leg portions spreadable in acordance with the tightening of said adjusting screws against the tree trunk so as to adjust to the thickness of the tree trunk.

4. The combination according to claim 3 wherein said springy wave-shaped band has a pair of ends spaced from one another within said peripheral groove so as to provide sufficient play for spreading said leg portions.

5. The combination according to claim 1 comprising lower insert means disposed in the water container so as to engage the severed end of the tree trunk for holding and centering the tree in the water container.

6. The combination according to claim 5 including a first wire screen disposed in the water container and supported by said upper insert means, and a second wire screen disposed in the water container and supported by said lower insert means, both of said wire screens having mesh adapted to receive therein the stems of flowers.

7. The combination according to claim 5 wherein said lower insert means includes at least one strip extending downwardly from said upper insert means, said strip having an upwardly bent lower end formed with a point, the upper end of said strip being secured to one of said holding screws.

8. The combination according to claim 1 comprising lower insert means including a centering device independent of said upper insert means and secured to the bottom of the water container.

9. The combination according to claim 1 including wire screening disposed in the water container and supported by said upper insert means, said wire screening having mesh adapted to receive the stems of flowers therein.

References Cited

UNITED STATES PATENTS

| | | | |
|---|---|---|---|
| 388,894 | 9/1888 | Masson-Chevallier | 248—44X |
| 1,739,462 | 12/1929 | Hunt et al. | 47—41.11 |
| 3,183,624 | 5/1965 | Swett | 47—41.11 |
| 3,250,504 | 5/1966 | Schwaderlapp | 248—44 |

FOREIGN PATENTS

| | | | |
|---|---|---|---|
| 13,265 | 1911 | Great Britain | 248—44 |
| 206,207 | 1/1940 | Switzerland | 248—44 |

ROBERT E. BAGWILL, Primary Examiner

U.S. Cl. X.R.

248—44